Fig. 3

United States Patent Office 3,798,264
Patented Mar. 19, 1974

3,798,264
PROCESS FOR PURIFICATION OF ACRYLIC ACID
BY EXTRACTION AND DISTILLATION
Kunihiro Kubota and Noboru Shimizu, Osaka, and Takashi Ohara, Nishinomiya, Japan, assignors to Nippon Shokubai Kogaku Kogyo Co., Ltd., Osaka, Japan
Filed Dec. 23, 1971, Ser. No. 211,239
Claims priority, application Japan, Dec. 26, 1970, 45/118,788
Int. Cl. C07c 57/04
U.S. Cl. 260—526 N       1 Claim

ABSTRACT OF THE DISCLOSURE

A process for the purification of acrylic acid comprising extracting an acrylic acid aqueous solution formed by the gas phase catalytic oxidation of propylene or acrolein, with an extracting solvent in an extraction zone, separating the extracting solvent from the extract in a distillation zone, and thereafter distilling off a mixture of acrylic acid and acetic acid from the remaining portion of the extract in a rectification zone, thereby to obtain acrylic acid substantially free of of acetic acid, said process being characterized in that the distillate from the rectification zone containing acrylic acid and acetic acid is recycled to the extraction zone.

---

This invention relates to a process for the purification of acrylic acid. More specifically, this invention relates to a process for recovering acrylic acid of high purity in a high yield from an acrylic acid aqueous solution obtained by the gas phase catalytic oxidation of propylene or acrolein.

It is well known in the art that the reaction product obtained by a method of preparing acrylic acid by the gas phase catalytic oxidation of propylene or acrolein contains, in addition to intended acrylic acid, such impurities as acetic acid, acetaldehyde, acetone and acrolein. Among these impurities, acetic acid is contained especially in great quantity, and its separation is the most important among the steps involved in the purification of acrylic acid.

It is an object of this invention to provide a process according to which acrylic acid substantially free of acetic acid can be recovered from an acrylic acid aqueous solution obtained by the gas phase catalytic oxidation of propylene or acrolein.

Other objects of this invention will be apparent from the description given hereinbelow.

This invention will now be explained by referring to the accompanying drawings in which:

FIG. 3 is a flow sheet illustrating the process for the purification of acrylic acid according to this invention.

Figure 1:
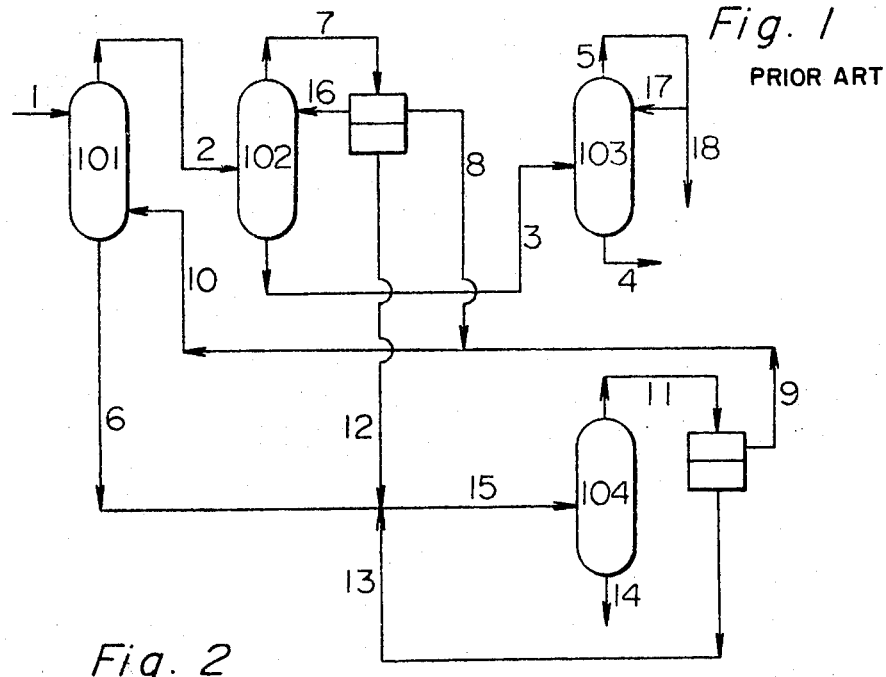
FIG. 1 is a flow sheet illustrating the known process for the purification of acrylic acid.

At first, an explanation is given of the conventional known process for the purification of acrylic acid (Chem. Eng., July 14, 1969, page 79) by referring to FIG. 1. An acrylic acid aqueous solution obtained by condensing the gas formed by the gas phase catalytic oxidation of propylene or acrolein is introduced into an extraction column 101 from a conduit 1. The solvent for extraction is introduced into the extraction column 101 from a conduit 10. The extract containing acrylic acid and acetic acid extracted in the extraction column 101 is then introduced into a distillation column 102 (which will sometimes be referred to as a "solvent-separating column" hereinbelow) from a conduit 2. The solvent and water contained in the extract are separated in the solvent-separating column 102, and the resulting liquid mixture containing acrylic acid and acetic acid is introduced from a conduit 3 into a rectification column 103 (which will be sometimes referred to as "acetic acid-separating column" hereinbelow). Acetic acid is distilled off from a conduit 5, and a part of the distilled acetic acid is recycle into the column 103 from a conduit 17 and the remainder is recovered from a conduit 18. Acrylic acid from which acetic acid has been separated is recovered from a conduit 4. The solvent and water are recovered from the top of the solvent-separating column 102 through a conduit 7. A part of the solvent layer is recycled to the solvent-separating column 102 through a conduit 16, and the remainder is recovered from a conduit 8. The water layer passes through a conduit 12 and is combined with the extraction residue liquor coming from the bottom of the extraction column 101 via a conduit 6, and the combined liquor is introduced into a solvent-recovering column 104 from a conduit 15. Water from which the solvent has been recovered is discharged through a conduit 14. The distillate coming from the top of the solvent-recovering column 104 via a conduit 11 is separated into solvent and water layers, and the solvent layer is recovered from a conduit 9 and the water layer is supplied to the solvent-recovering column 104 through conduits 13 and 15.

Since either acrylic acid or acetic acid has a relatively low relative volatility, a distillation column having a great number of stages is necessary for separating acetic acid from acrylic acid substantially completely according to such conventional process. In general, the distillation is conducted under reduced pressure in order to prevent occurrence of polymerization of acrylic acid. However, in a distillation column of a great number of stages, the pressure loss is extreme and hence, the column top pressure must be reduced considerably. This is one disadvantage of the conventional process. Further, in case the column bottom is maintained at high temperatures, acrylic acid is likely to dimerize or polymerize. Accordingly, there is brought about a disadvantage that the operation has to be stopped because of adhesion of scales or polymerization of acrylic acid.

Figure 2:
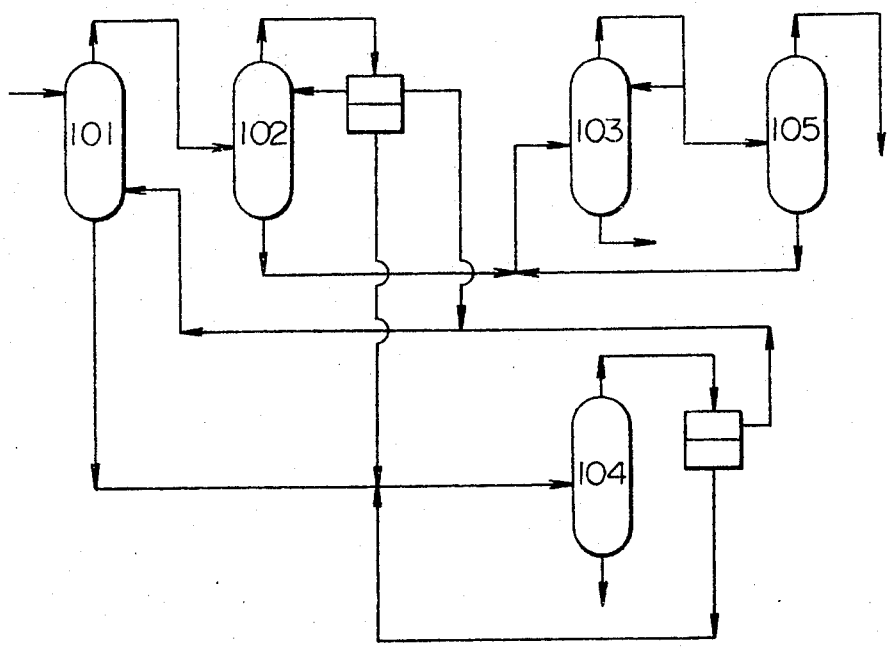
FIG. 2 is a flow sheet illustrating a process for the purification of acrylic acid which we tried during the development of this invention but which could not attain good results.

If the number of the stages is decreased in order to avoid the above disadvantages, the concentration of acrylic acid in the distillate must be heightened so as to obtain acrylic acid having a low acetic acid content, which results in loss of acrylic acid. Further, in order to avoid such loss of acrylic acid, it is necessary to provide a second rectification column 105 (which will be referred to as "second acetic acid-separating column" somewhere hereinbelow) such as illustrated in FIG. 2. Provision of two rectification columns is not preferred, because the equipment cost increases and the operation procedures becomes complicated.

We have found that in the above-mentioned conventional purification process there is another fatal disadvantage that in the acetic acid-separating column 103 polymerization of acrylic acid is very frequently caused to occur. According to our experiments it has been found that when the operation is carried out in a manner such that the concentration of acrylic acid contained in acetic acid in the conduit 5 will be 5% by weight, polymerization is caused to occur in the interior of the column above the supply portion. Thus, the operation had to be stopped in 4–5 days from the initiation of the operation because of clogging of trays. With a view to preventing occurrence of such undesired phenomenon, we tried to recover acrylic acid of high purity by providing a second rectification column 105 such as illustrated in FIG. 2 and rectifying in column 105 the column top distillate containing 10–70% by weight of acrylic acid of the acetic acid-separating column 103. Then, the polymerization did not occur in the column 103 but occurred in the second rectification column and it was impossible to conduct the operation continuously.

We have furthered our research with a view to developing a purification process overcoming the above-mentioned defects, and have now arrived at the process of this invention according to which the purification operation can be conducted continuously for a long time very stably without occurrence of cloggings in the distillation column, and acrylic acid of high quality can be obtained in a high yield.

In accordance with this invention there is provided an acrylic acid purification process characterized in that the acrylic acid concentration in the column top distillate of the acetic acid-separating column 103 is adjusted to 10–70% by weight, said distillate is recycled to the extraction step or a step preceding the extraction step, such as the step of condensing the reaction product gas or the step of stripping low boiling point compounds, and that acrylic acid is extracted with an extracting solvent in the extraction column 101. In this process, a part of acetic acid fed is extracted together with acrylic acid, but the remainder of acetic acid is removed together with the extraction residue liquor. As a result, it is made possible to operate the acetic acid-separating column 103 continuously for a long time without clogging of the column and to heighten the recovery ratio of acrylic acid, and thus, highly purified acrylic acid of a very low acetic acid content can be obtained.

Figure 3:
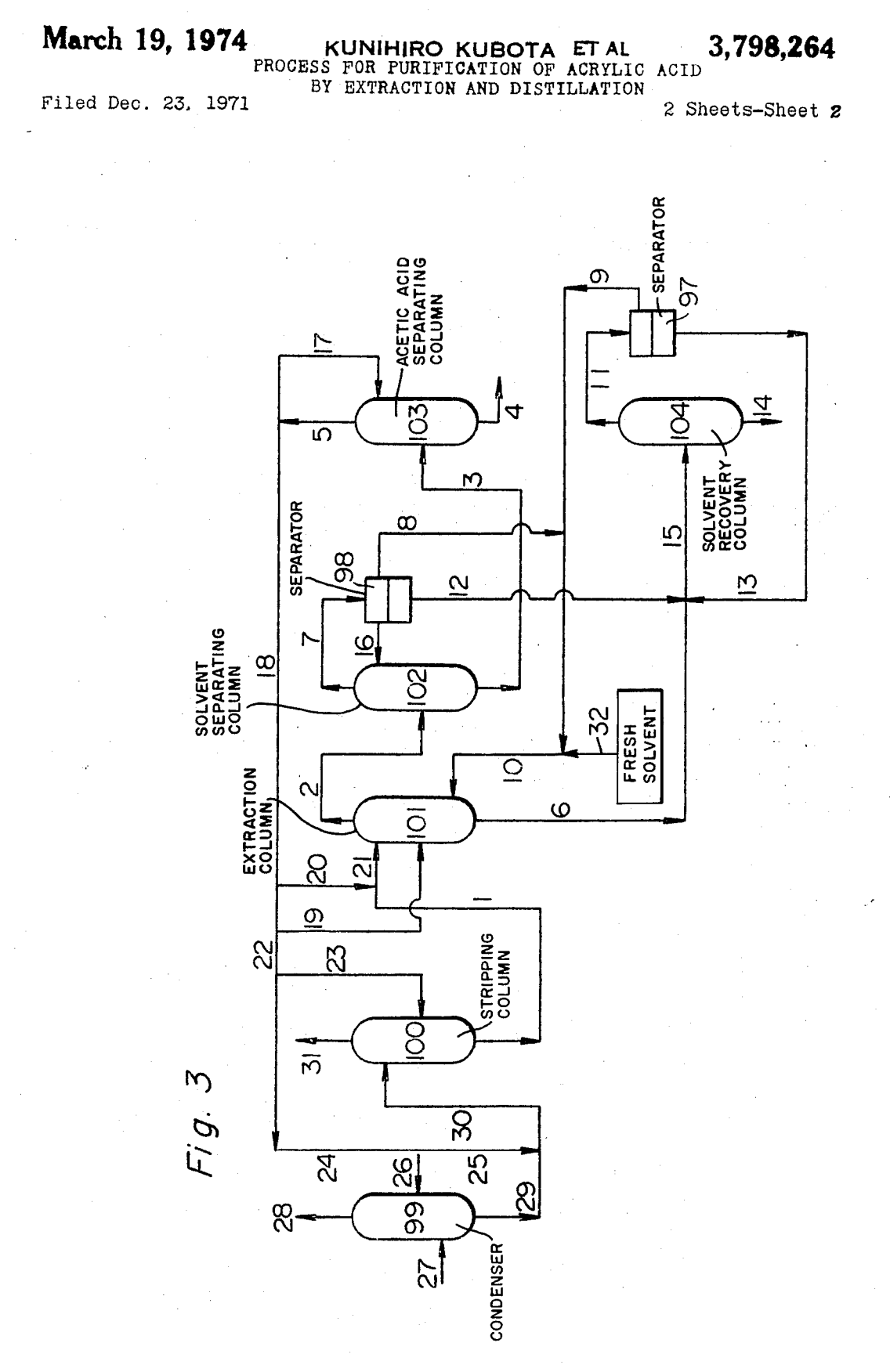

A preferable embodiment of the process of this invention will now be detailed by referring to FIG. 3.

The gas formed by the gas phase catalytic oxidation of propylene or acrolein is forwarded to a condenser 99 through a conduit 27. The condensation is conducted by indirect cooling, or the reaction product gas may be directly cooled by a condensate cooled by indirect cooling. In this invention, however, the condensation method is not critical. The condensate coming from the condenser 99 is introduced through conduits 29 and 30 into a low boiling point compound-stripping column 100. The noncondensing gas contained in the reaction product gas is discharged through a conduit 28, and low boiling point compounds are discharged through a conduit 31. An acrylic acid aqueous solution is introduced into an extraction column 101 through conduits 1 and 21. An extracting solvent is introduced into the extraction column 101 from a conduit 10. In the extraction column 101, acrylic acid and a part of acetic acid are extracted, and the remainder of acetic acid is removed from the extraction residue liquor. The extract containing extracted acrylic acid and the extracted part of acetic acid is introduced through a conduit 2 into a solvent-separating column 102, where the solvent and water in the extract are separated therefrom. A mixed liquor of acrylic acid and acetic acid is introduced through a conduit 3 into an acetic acid-separating column 103. A part of a mixed liquor of acrylic acid and acetic acid distilled from the column 103 is recycled to the column 103 through a conduit 5 via a conduit 17, and the remainder of the mixed liquor is recycled to (1) the extraction column 101 through conduits 18 and 19, (2) the extraction column 101 through conduits 20 and 21 after it has been mixed with the acrylic acid aqueous solution coming from the stripping column 100, or (3) the stripping column 100 through conduits 22 and 23, or is mixed with (4) the acrylic acid aqueous solution from the condenser 99 after the passage through conduits 22, 24 and 25, or recycled to (5) the condenser 99 through conduits 22, 24 and 26. From a conduit 4 there is recovered acrylic acid of high purity from which acetic acid has been separated. From the column top of the solvent-separating column 102 the solvent and water are recovered through a conduit 7, and they are separated in a separator 98. A part of the solvent layer is recycled to the column 102 from a conduit 16, and the remainder is recovered from a conduit 8. The water layer passes through a conduit 12 and is combined with the extraction residue liquor coming from the extraction column 101 through a conduit 6. The combined liquor is introduced into the solvent-recovering column 104 via a conduit 15. Acetic acid-containing water from which the solvent has been recovered is discharged through a conduit 14. The distillate from the top of the solvent-recovering column comes into a separator 97 through a conduit 11. The solvent layer separated in the separator 97 is recovered through a conduit 9, and the water layer is supplied to the solvent-recovering column 104 through conduits 13 and 15. Fresh solvent, as needed, is supplied to conduit 10 from a fresh solvent supply source through conduit 32.

The acrylic acid aqueous solution which is applicable to the process of this invention is one obtained by condensing the product gas formed by subjecting propylene and/or acrolein to the gas phase catalytic oxidation according to the conventional method and it generally contains acrylic acid at a concentration of 5–50% by weight.

In the process of this invention, the extraction for concentrating the acrylic acid aqueous solution may be conducted according to the customary method. As the extracting solvent there is used a solvent having an acrylic acid distribution coefficient-to-acetic acid distribution coefficient ratio exceeding 1. Examples of such solvents include ethyl acetate, n-propyl acetate, isopropyl acetate, n-butyl acetate, isobutyl acetate, sec-butyl acetate, methyl propionate, ethyl propionate, methyl acrylate and ethyl acrylate. Ketones such as methyl isobutyl ketone may also be used as the extracting solvent.

The extraction may be performed by introducing the solvent from the column bottom and the acrylic acid aqueous solution from the column top. In addition to the above method, there may be adopted a method comprising introducing the solvent from the column bottom and the acrylic acid aqueous solution from the middle of the column while charging water from the column top, to thereby prevent extraction of acetic acid as much as possible. Customary extraction columns can be used in the process of this invention, and the kind of the extraction column is not critical in this invention.

In this invention, also the method of recovering the solvent from the extraction residue liquid or from water containing the solvent dissolved therein is not limited to the one illustrated in FIG. 3. Any of the customary techniques may be applied to the solvent recovery in this invention, and the kind of solvent-recovering method is not critical in this invention.

The distillation for separation of the solvent may be conducted under customarily adopted conditions. However, since acrylic acid tends to dimerize when allowed to stand at high temperatures, it is preferred to conduct the distillation at low temperatures. It is also preferred to maintain the pressure at less than 300 mm. Hg during the distillation.

In the process of this invention, even when the mixed acrylic acid and acetic acid coming from the solvent-separating column still contains the solvent incorporated therein, it is distilled off from the top of the acetic acid-separating column together with acetic acid and recycled to the extraction step. Accordingly, even in case a solvent having a boiling point approximating that of acetic acid, such as butyl acetate and methyl isobutyl ketone is used as the extracting solvent, it is unnecessary to increase especially the number of the stages in the solvent-separating column.

As in the case of the solvent-separating column, it is preferred to conduct the rectification at low temperatures in the acetic acid-separating column. It is also preferred to conduct the operation in the acetic acid-separating column under a pressure lower than 300 mm. Hg.

As described hereinabove, we have found to our surprise that as the acrylic acid content in the distillate of the acetic acid-separating column is lower, polymerization is caused more easily to occur in the column. The reason for this phenomenon is presumed to be that impurities having a boiling point approximating that of acetic acid and acting as the polymerization initiator for acrylic acid is gradually accumulated with the concentration of acetic acid. Based on the above finding, in a preferred embodiment of the process of this invention, the operation is so adjusted that the acrylic acid concentration in the distillate from the acetic acid-separating column will be 10–70% by weight, whereby occurrence of polymerization in the column can be prevented effectively. In this invention, as described above, acrylic acid contained in the distillate from the acetic acid-separating column can be recovered in the final stage, by recycling the distillate to the extraction step, the condensation step or the step of stripping low boiling point compounds. Accordingly, even if the distillate from the top of the acetic acid-separating column contains acrylic acid at such a high concentration as described above, this does not bring about any disadvantage. Of course, in this invention it is permissible to use a known polymerization inhibitor such as hydroquinone, hydroquinone monomethyl ether and phenothiazine in the acetic acid-separating column.

The characteristic features of this invention described hereinabove will now be summarized below.

(1) In the step of separating acetic acid contained in acrylic acid by rectification, occurrence of polymerization in the rectification column (acetic acid-separating column) can be prevented by increasing the acrylic acid concentration in the distillate from the top of the column.

(2) Since acrylic acid contained in the distillate can be recovered by recycling the distillate to the extraction step, the condensation step or the step of stripping low boiling point compounds, the yield of acrylic acid can be heightened.

(3) Since in the acetic acid-separating column it is unnecessary to concentrate acetic acid of the column top distillate, the amount of acetic acid to be contained in acrylic acid can be extremely reduced with ease, whereby it is possible to obtain acrylic acid of high purity.

(4) When the extract from the extraction column which contains acrylic acid and a part of acetic acid is treated in the solvent-separating column to separate the solvent therefrom, even if the solvent is still contained in the mixed liquor of acrylic acid and acetic acid coming from the column bottom, the solvent can be easily recovered and reused. Accordingly, the distillation operation in the solvent-separating column can be greatly facilitated and the solvent loss can be much reduced.

This invention will now be detailed by referring to examples.

EXAMPLE 1

The purification was conducted according to the process illustrated in FIG. 3. As the extraction column 101 there was used a pulsating perforated plate column having 50 perforated plates, and as the solvent-separating column 102 was used a plate column having 20 stages. A plate column having 40 stages and a packed column having a packing height of 10 m. were used as the acetic acid-separating column 103 and the solvent-recovering column 104, respectively.

An aqueous solution containing 23% by weight of acrylic acid and 2.0% by weight of acetic acid was fed to the upper portion of the extraction column 101 through conduits 1 and 21 at a rate of 70 kg./hr. This aqueous solution was obtained by condensing the reaction product gas formed by the gas phase catalytic oxidation of propylene and removing from the condensate acetaldehyde, acetone, acrolein and other impurities. The distillate from the top of the acetic acid-separating column 103 containing 40% by weight of acrylic acid, 52% by weight of acetic acid, and methyl isobutyl ketone, water etc., was fed to the 15th stage, counted from the top, of the extraction column 101 at a rate of 2.0 kg./hr. through conduits 18 and 19. Valves were closed so that any liquid would not be allowed to flow through conduits 20 and 22. Methyl isobutyl ketone as solvent was fed into the lower portion of the extraction column 101 through a conduit 10 at a rate of 45 kg./hr. The extract coming from the extraction column 101 was introduced into the solvent-separating column 102 through a conduit 2.

The distillate from the top of the solvent-separating column 102 was separated into solvent and water layers by a separator 98. Hydroquinone was added to the solvent layer at a rate of 100 g./hr., and it was then recycled to the solvent-separating column 102. The distillation was conducted while maintaining the column top pressure at 180 mm. Hg and from the column bottom there was obtained a liquor containing 5.8% by weight of acetic acid at a rate of 18.1 kg./hr.

The liquor coming from the bottom of the solvent-separating column 102 was then introduced into the acetic acid-separating column 103 to effect rectification. In the column 103, the column top pressure was maintained at 160 mm. Hg. Hydroquinone was added at a rate of 5.0 g./hr. to the liquor to be recycled to the column 103. The distillate was recycled to the extraction column 101 through conduits 18 and 19. From the bottom of the acetic acid-separating column 103 there was obtained a liquor of an acetic acid content of less than 0.1% by weight at a rate of 16.15 kg./hr. Throughout the above steps, the yield of acrylic acid inclusive of the dimer thereof was 99.3%.

In the above-explained manner, the operation of the acetic acid-separating column 103 was continued for one month. Although the column bottom pressure, which had been 195 mm. Hg at the initiation of the operation, was changed to 202 mm. Hg during one month operation, it did not bring about any trouble for the operation of the column.

EXAMPLE 2

The purification was conducted in the same manner as in Example 1 by employing the same apparatus as used in Example 1, except that the acrylic acid concentration in the distillate from the top of the acetic acid-separating column 103 was adjusted to 10% by weight. The column bottom pressure of the column 103, which had been 195 mm. Hg at the initiation of the operation, rose to 275 mm. Hg in 14 days, during which the operation could be continued.

COMPARATIVE EXAMPLE 1

The operation was conducted in the same manner as in Example 1 except that the acrylic acid concentration in the distillate from the acetic acid-separating column 103 was adjusted to 5% by weight. The column bottom pressure in the column 103, which had been 195 mm. Hg at the initiation of the operation, rose to 270 mm. Hg in 95 hours, and at that point the continuation of the operation became impossible.

EXAMPLE 3

The purification was carried out according to the process steps illustrated in FIG. 3. A rotary disc column was used as the extraction column 101 and a plate column of 20 stages was used as the solvent-separating column 102. A plate column of 40 stages and a packed column of a packing height of 10 m. were used as the acetic acid-separating column 103 and the solvent-recovering column 104, respectively.

An aqueous solution containing 18.0% by weight of acrylic acid and 2.0% by weight of acetic acid was fed to the upper portion of the extraction column 101 at a rate of 60 kg./hr. through conduits 1 and 21. This aqueous solution was obtained by condensing the reaction product gas formed by the gas phase catalytic oxidation of propylene and removing acetoaldehyde, acetone, acrolein and other impurities from the condensate by distillation.

The distillate from the top of the acetic acid-separating column 103 containing 40% by weight of acrylic acid and 59% by weight of acetic acid was introduced into the upper portion of the extraction column 101 at a rate of 2 kg./hr. through the conduits 18, 20 and 21. Valves were closed so that any liquid would not be allowed to flow through conduits 19 and 22. N-propyl acetate as extracting solvent was fed to the extraction column 101 at a rate of 40 kg./hr. through a conduit 10. The extract from the extraction column 101 was introduced into the solvent-separating column 102 through a conduit 2.

The distillate from the top of the solvent-separating column 102 was separated into solvent and water layers by a separator 98. The solvent layer was recycled to the solvent-separating column 102 after hydroquinone had been added thereto at a rate of 100 g./hr. The column top pressure was maintained at 50 mm. Hg. A liquor containing 9.3% by weight of acetic acid was recovered at a rate of 12.7 kg./hr. from the column bottom.

The liquor from the bottom of the solvent-separating column 102 was fed to the acetic acid-separating column 103, and the rectification was conducted while maintaining the column top pressure at 40 mm. Hg. A portion of the distillate to be recycled to the column 103 was incorporated with hydroquinone at a rate of 40 g./hr. The remaining distillate was recycled to the extraction column 101 through conduits 18, 20 and 21. From the column bottom, acrylic acid of an acetic acid content of less than 0.1% by weight was recovered at a rate of 10.75 kg./hr.

When the acetic acid-separating column 103 was operated continuously for one month, the column bottom pressure, which had been 72 mm. Hg at the initiation of the operation, was changed to 77 mm. Hg in one month but this did not bring about any trouble for continuation of the operation.

EXAMPLE 4

The operation was carried out in the same manner as in Example 3, except that the acrylic acid concentration in the distillate from the top of the acetic acid-separating column 103 was changed to 10% by weight. The operation of the acetic acid-separating column 103 could be continued for 15 days, during which the column bottom pressure, which had been 72 mm. Hg at the initiation of the operation, rose to 130 mm. Hg.

EXAMPLE 5

The operation was carried out in the same manner as in Example 3, except that the acrylic acid concentration in the distillate from the column of the acetic acid-separating column 103 was changed to 20% by weight. The operation of the acetic acid-separating column 103 could be continued for one month, during which the column bottom pressure, which had been 72 mm. Hg at the initiation of the operation, rose to 105 mm. Hg, but this did not bring about any trouble for continuation of the operation.

EXAMPLE 6

The operation was carried out in the same manner as in Example 3, except that the acrylic acid concentration in the distillate from the top of the acetic acid-separating column 103 was changed to 70% by weight. The operation of the acetic acid-separating column 103 could be continued for one month, during which the column bottom pressure rose from 72 mm. Hg to 74 mm. Hg, but this did not bring about any trouble for continuation of the operation.

COMPARATIVE EXAMPLE 2

The operation was carried out in the same manner as in Example 3, except that the acrylic acid concentration in the distillate from the top of the acetic acid-separating column 103 was changed to 1.5% by weight. The column bottom pressure of the acetic acid-separating column 103 rose from 72 mm. Hg to 130 mm. Hg after 17 hours' operation, and at that point continuation of the operation of the column 103 became impossible.

COMPARATIVE EXAMPLE 3

The operation was carried out in the same manner as in Example 3, except that the acrylic acid concentration in the distillate from the top of the acetic acid-separating column 103 was changed to 5% by weight. The column bottom pressure of the acetic acid-separating column 103 rose from 72 mm. Hg to 130 mm. Hg after 103 hours' operation, and at that point continuation of the operation of the column 103 became impossible.

EXAMPLE 7

The purification was carried out according to the process steps illustrated in FIG. 3. A packed column of a packing height of 2 m. was used as the condenser 99 and a packed column of a pack height of 7 m. was used as the column 100 for stripping low boiling point compounds. The same columns as used in Example 1 were employed as the extraction column 101, the solvent-separating column 102 and the acetic acid-separating column 103.

A reaction product gas obtained by the gas phase catalytic oxidation of propylene was fed to the column bottom of the condenser 99. An acrylic acid aqueous solution recovered from the bottom of the condenser 99 was cooled by an indirect cooler and then fed to the column head of the condenser 99 as the cooling medium. The distillate from the head of the acetic acid-separating column 103 containing 40% by weight of acrylic acid, 52% by weight of acetic acid, and methyl isobutyl ketone, water, etc., was fed to the upper portion of the condenser at a rate of 2.0 kg./hr. through conduits 18, 22, 24 and 26. Valves were closed so that any liquid will not be allowed to flow through conduits 19, 20, 23 and 25.

The condensate obtained from the column bottom portion of the condenser was fed to the upper portion of the column 100 for stripping low boiling point compounds through conduits 29 and 30. After stripping of low boiling point compounds, the condensate liquor was introduced into the extraction columns 101 through conduits 1 and 21. The subsequent procedures were conducted in the same manner as in Example 1.

The operation was continued for one month. Although the column bottom pressure of the acetic acid-separating column 103, which had been 195 mm. Hg at the initiation of the operation, rose to 202 mm. Hg, this did not give any trouble to continuation of the operation of the column 103.

COMPARATIVE EXAMPLE 4

The purification was conducted according to the process steps illustrated in FIG. 2. The same column as used in Example 3 were employed as the extraction column 101, the solvent-separating column 102, the acetic acid-separating column 103 and the solvent-recovering column 104, and as the second acetic acid-separating column 105 there was used a plate column of 40 stages. The solvent and acrylic acid aqueous solution to be fed to the extraction column 101 were the same as those used in Example 3.

The operation was carried out while adjusting the acrylic acid concentration in the distillate from the head of the first acetic acid-separating column 103 to 40% by weight, and this distillate from the column 103 was then introduced in the second acetic acid-separating column 105 where the column head pressure was maintained at 40 mm. Hg. The acrylic acid concentration in the distillate from the head of the column 105 was adjusted to 1% by weight, and the distillate was recycled to the column 105 after hydroquinone had been added thereto at a rate of 50 g./hr. The column bottom pressure of the second acetic acid-separating column 105, which had been 72 mm. Hg at the initiation of the operation, rose to 130 mm. Hg after 17 hours' operation, and at that point continuation of the operation of the column 105 became impossible.

What we claim is:

1. A process for the purification of acrylic acid comprising
    (a) condensing in a condensation zone the reaction product gas formed by the gas phase catalytic oxidation of propylene or acrolein to obtain as condensate an acrylic acid aqueous solution containing a small amount of acetic acid as a main impurity;
    (b) extracting said acrylic acid aqueous solution in an extraction zone with an extracting solvent obtained from a solvent recovery zone and a solvent separating zone in order to obtain from said extraction zone
        (i) an extract and
        (ii) an extraction residue liquor;
    (c) feeding said extraction residue liquor from step (b) to said solvent recovery zone to separate said extracting solvent and water; recycling said extraction solvent to step (b) and removing said water;
    (d) feeding said extract from step (b) to said solvent separating zone to recover said solvent as distillate and a mixed liquor of acrylic acid and acetic acid as the bottoms component;
    (e) treating said bottoms component from step (d) in an acetic acid separating zone to form
        (i) substantially pure acrylic acid as bottoms product; and
        (ii) a distillate containing acrylic acid and acetic acid as head product in which said acrylic acid component is adjusted to 10–70% by weight; and
    (f) recycling said head product from step (e) to the extracting zone of step (b) either directly or via the condensation zone of step (a) or both.

References Cited

UNITED STATES PATENTS

| 3,689,541 | 9/1972 | Sennewald et al. | 203—15 |
| 3,433,831 | 3/1969 | Yomiyama et al. | 203—15 |

OTHER REFERENCES

Chemical Engineering, vol. 76, July 14, 1969, pp. 78–80.

WILBUR L. BASCOMB, JR., Primary Examiner

U.S. Cl. X.R.

203—15, 43, 84